United States Patent [19]
Galen et al.

[11] 3,865,244
[45] Feb. 11, 1975

[54] BICYCLE RACK

[76] Inventors: Ralph W. Galen, 131 Mt. Auburn, Cambridge, Mass. 02134; John A. Vanderpoel, Crescent Rd., Concord, Mass. 01742

[22] Filed: Oct. 12, 1973

[21] Appl. No.: 406,016

[52] U.S. Cl. ................................. 211/5, 211/24
[51] Int. Cl. .................... E05b 73/00, A47f 7/04
[58] Field of Search .......................... 211/5–24; 280/297; 292/278, 285, 286

[56] References Cited
UNITED STATES PATENTS

| | | | |
|---|---|---|---|
| 590,425 | 9/1897 | Smart | 211/5 |
| 605,628 | 6/1898 | Bradley | 211/5 |
| 607,795 | 7/1898 | Gallaway | 280/297 X |
| 2,464,683 | 3/1949 | Herbolt et al. | 70/235 |
| 3,739,609 | 6/1973 | Kaufmann | 211/5 |
| 3,762,569 | 10/1973 | Spring | 211/5 |
| 3,783,659 | 1/1974 | Rossi | 211/5 |

FOREIGN PATENTS OR APPLICATIONS

| | | | |
|---|---|---|---|
| 1,628 | 7/1898 | Denmark | 211/20 |
| 71,935 | 4/1943 | Czechoslovakia | 211/22 |
| 547,741 | 10/1957 | Canada | 211/22 |
| 1,067,186 | 6/1954 | France | 20/235 B |

Primary Examiner—Paul R. Gilliam
Assistant Examiner—Andrew M. Calvert
Attorney, Agent, or Firm—Schiller & Pandiscio

[57] ABSTRACT

A device is provided for supporting and locking a bicycle. It comprises a channel member for receiving the front and rear wheels of the bicycle, a supporting section which includes a support member fixed with respect to the channel member and a slide member which is slidable relative to the support member toward and away from the channel member, and a pivotally mounted clamping mechanism for clamping a portion of the frame of the bicycle to the slide member against movement relative to the support member. A wheel locking bar is also provided for clamping the front wheel in the channel.

17 Claims, 5 Drawing Figures

PATENTED FEB 11 1975　　3,865,244

BICYCLE RACK

This invention relates to a device for supporting and locking a bicycle, and in particular to a device which is adjustable for securing and locking a bicycle of substantially any conventional size or design.

In recent years, there has been a resurgent popularity in bicycles which is more than likely attributable to an increased awareness in physical fitness as well as the environmental crises resulting from the use of the automobile. With this resurgent popularity, however, more and more bicycles are being tampered with as well as stolen.

As a result, many devices have been proposed for securing and locking bicycles. Some of these devices are designed to secure the frame and usually the rear wheel of the bicycle together. For example, bicycle locks which have a long shackle to accommodate both the frame and wheel are very popular. Another example which is used quite extensively, is the lock and chain. The chain is usually long enough to be wrapped around the frame and wheel as well as some immovable object such as a tree trunk, lamp post, supports for traffic signs, etc. The lock is then used to secure the two ends of the chain together, thereby securing the bicycle to the immovable object. These devices however, have proven inadequate since most commercially available locks including bicycle locks can be easily broken with various tools. Further, when a lock and chain are used, the chain can easily be cut with bolt cutters, making it easy for thieves to take the bicycles. Additionally, instances have occured where the bicycles are physically carried away when the bicycle lock is used. Other instances have occurred where the bicycle was secured to an immovable object, and the thief lifted the bicycle and chain over the object to which it is secured to slip the chain off and carry the bicycle away. It has also been found that although these devices may deter thieves from stealing the bicycles, the bicycles can still be easily tampered with, e.g. the front wheel may be removed.

Although various bicycle security stands have been proposed, many are inadequate since they only can be used to secure one wheel and frame thereby suffering from the same disadvantages as the bicycle lock and lock and chain. Further, many are unstable as well as easily movable and some are not adjustable to accommodate bicycles of different sizes and design. Furthermore, the locks are left unprotected and consequently can be easily broken and the bicycle taken.

Accordingly, an object of the present invention is to provide an improved device which overcomes the aforementioned problems.

Another object of the present invention is to provide a novel device for supporting and holding a bicycle which will aid in preventing theft.

Still another object of the present invention is to provide a device which is adjustable for securing and locking the frame and both wheels of any normal size or design bicycle.

Yet another object of the present invention is to provide an improved bicycle security stand which is stable as well as immovable and which has means for shielding the lock so that the latter cannot be easily broken.

The foregoing and other objects are accomplished by a device for supporting and holding a bicycle which includes a base section having channel means for receiving the front and rear wheels of the bicycle, a support member that is fixed with respect to the base section, a slide member which is slidable relative to the support member toward and away from the channel means, and a pivotally mounted clamping mechanism for clamping a portion of the frame of the bicycle to the slide member against movement relative to the support member.

Other features and many of the attendant advantages of the invention are described or rendered obvious by the following detailed description which is to be considered together with the accompanying drawings.

FIG. 5 is a side view in elevation of the embodiment of FIG. 1 showing how it is used to secure a bicycle.

Figure 1:
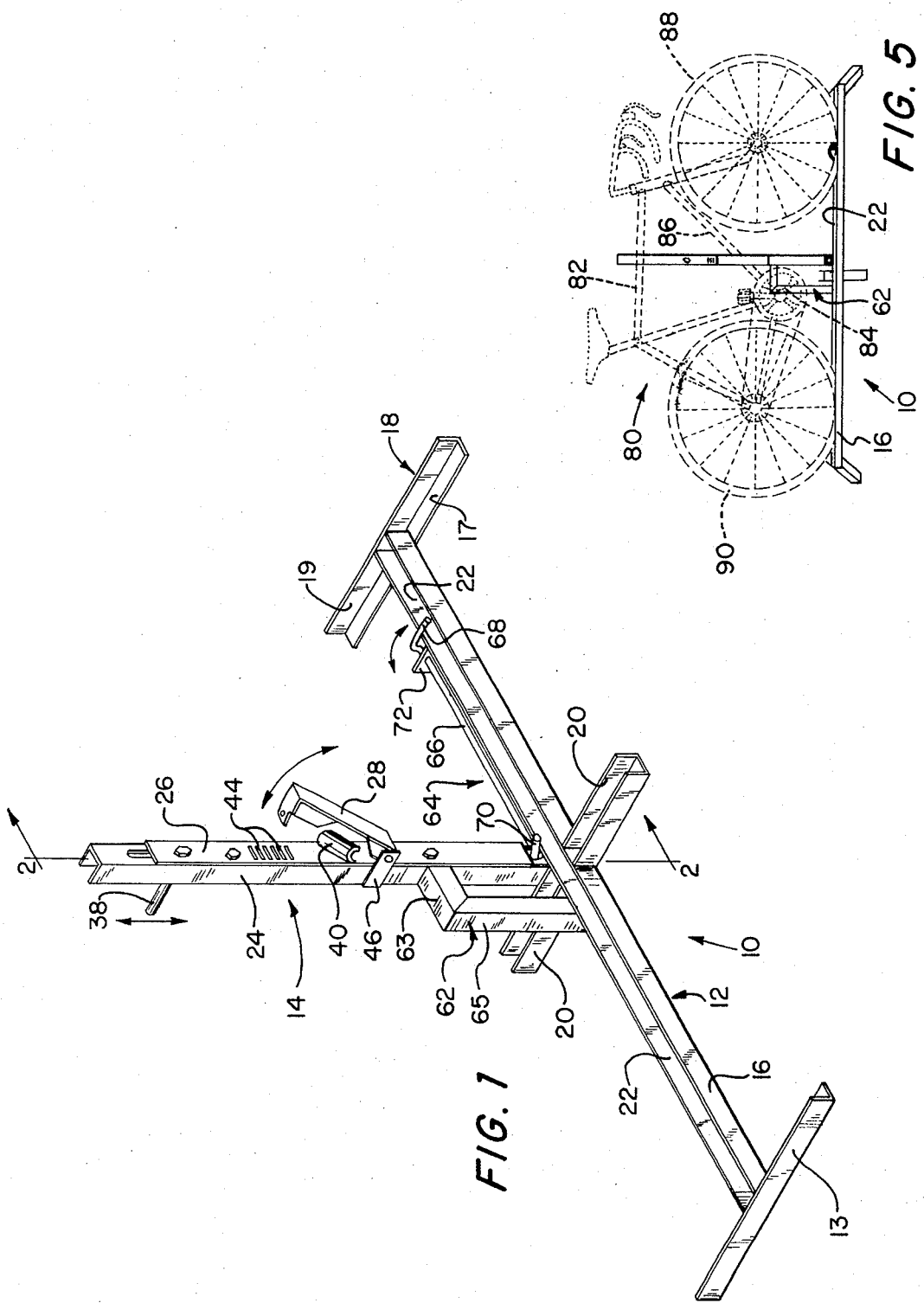
FIG. 1 is a perspective view of one embodiment of the bicycle support embodying the features of the present invention.

Referring to the drawings, wherein like numerals refer to like parts, the illustrated bicycle security stand shown in FIG. 1 comprises a horizontal base section 12 and a vertical bicycle-supporting section 14. Base section 12 comprises an elongate channel member 16, end members 18 and intermediate bracing members 20. These members are made of steel or other suitable metals and are secured to one another by welding or brazing.

The channel member 16 is straight and has a U-shaped cross-section forming a channel 22. Channel 22 is dimensioned so that its width is slightly larger than the width of a standard size bicycle wheel in order that the former will snuggly accommodate the latter. Channel 22 is made sufficiently long to receive the largest of the conventionally sized bicycles.

An end member 18 is connected to each end of member 16 in order to provide stability to the stand. Preferably, in order to provide maximum stability, end members 18 are disposed so that they are perpendicular to channel member 16. The end members are shown as angle irons of L-shaped cross-section having a first portion 17 disposed at a right angle to a second portion 19. The ends of member 16 overlie and are affixed to the portions 17 of each of the end members 18 so that the portions 19 of each end member 18 can function as stops for the bicycle wheels. Although the members 18 are shown as having an L-shaped cross-section, it will be appreciated, that other end members of other cross-sectional shape, e.g. channel members like members 16 would be equally effective.

In order to provide additional stability, bracing members 20 may be provided substantially at the center of channel member 16, approximately where the bicycle-supporting section is connected to the channel member 16. Bracing members 20 are connected on each side of member 16 so that they are substantially perpendicular to member 16. It will be appreciated that although members 20 are shown with a U-cross sectional shape, other cross-sectional shapes can be utilized, such as members having an L-shaped cross-section.

The entire base section 12 is designed to be partially embedded in or anchored to a concrete foundation or footing embedded in the ground so that the channel 22 remains exposed. The base section may be anchored by means of bolts passing through holes in end members 18 and bracing members 20 and anchored in the concrete footing or foundation.

Figure 2:
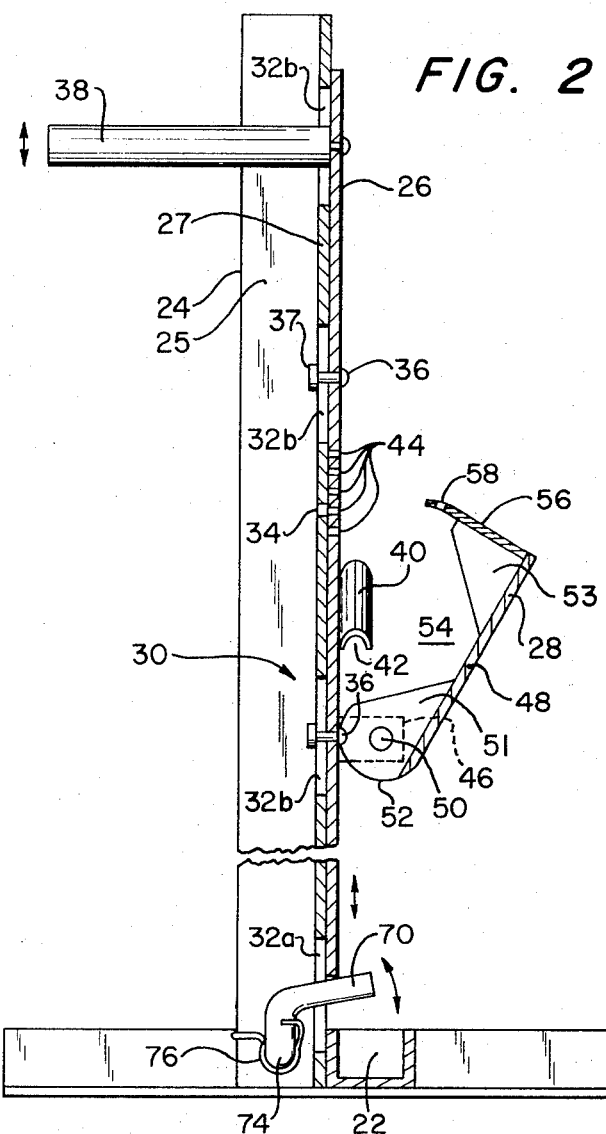
FIG. 2 is a cross-sectional view taken substantially along line 2—2 of FIG. 1.

The support section 14, as shown in FIG. 1 and in greater detail in FIG. 2, comprises a vertical support member 24, a slide member 26 and a clamping mechanism 28. The support member 24 is connected to one side of the member 16 and preferably also to one of the bracing members 20. The member 24 is made of channel iron and thus has opposite side wall sections 25 and a base or connecting section 27 defining a channel 30. The open side of support member 24 faces away from channel member 16. A plurality of elongated guide apertures or slots 32 and a lock aperture or slot 34 are disposed along the center line of the base section 27 of support member 24. As will be apparent hereinafter, slots 32 extend lengthwise of support member 24. One of the apertures 32a is disposed relatively close to channel member 16 and is sized to accommodate the wheel locking bar 64, while the remaining slots, 32b are sized to accommodate guide pins 36, all of which will be described in greater detail hereinafter. The lock aperture 34 is preferably disposed between two of the apertures 32b, and is intended to receive the tongue 56 of clamping mechanism 28, the latter also being described in greater detail hereinafter.

Slide member 26 is mounted on support member 24 by means of a plurality of guide pins 36 which cooperate with corresponding apertures 32b to enable member 26 to slide relative to the support member 24 toward and away from the channel 22. Each pin 36 is designed so that it has a shank portion which extends through a hole in slide member 26 as well as aperture 32b and a head which engages the front side of slide member 26. The other end of each pin 36 is provided with a nut 37 which engages the rear side of the base section of support member 24. This end of each pin 36 is swaged or peened over so as to prevent removal of the nut 37. Alternatively pins 36 may be rivets with the head of the rivet engaging the rear side of the base section of support member 24 and the end of the rivet secured to slide member 26. Pins 36 have a length such as to hold slide member 26 in close but sliding engagement with support member 24.

A handle 38 may be attached to slide member 26 to facilitate easy handling of the latter. The handle may extend through one of the apertures 32b and channel 30 so that when a bicycle is placed with its wheels in channel 22, slide member 26 can easily be manipulated from the rear of the stand. It will be appreciated however, that handle 38 can also be mounted on the front of slide member 26 in a position where it will not hit the bicycle frame when the bicycle is mounted in the stand.

A bicycle frame retaining member 40 is attached to and movable with the slide member 26. Member 40 comprises a semi-cylindrical member providing a channel 42 which has a diameter which is slightly greater than the diameter of the frame tubing of the lower forward reach of a conventional bicycle. Channel 42 faces channel 22 and extends at an acute angle (for conventional bicycles this angle is 45°) to channel member 16 so that it is parallel with and will embrace the lower forward reach of a bicycle frame when the bicycle is mounted on the stand. In this way member 40 can act to hold the bicycle frame down in channel 22.

Finally, slide member 26 is provided with a plurality of horizontally elongate apertures 44. Each of the apertures 44 is selectively alignable with aperture 34 of member 24 by relative movement of slide member 26 and support member 24. The apertures 42 are all sized to accommodate the tongue 56 of clamping mechanism 28 as will become apparent hereinafter.

The clamping mechanism 28 comprises a pair of bracket arms 46, a hasp in the form of a lever arm 48, and pivot pin 50. Brackets 46 are essentially two flat plates which are affixed by welding to the side sections 25 of member 24. The length of bracket arms 46 is sufficient so that the latter extend out over channel 22 and past slide member 26 so as to accommodate the pivotal end of lever arm 48 and pivot pin 50.

Figure 3:
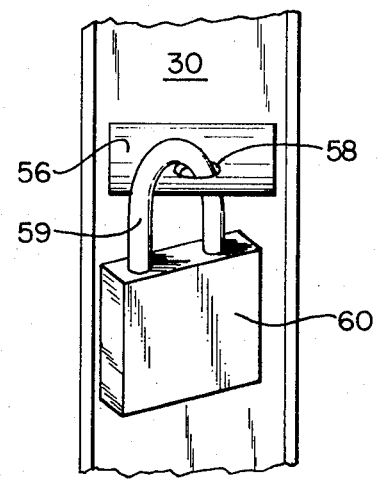
FIG. 3 is an enlarged partial rear view of the device in the locked position.

One end of lever arm 48 has integrally formed ears 51 which fit between bracket arms 46 and have aligned holes to accommodate pivot pin 50. The other end of lever arm 48 has a tongue 56 and ears 53 which reinforce tongue 56. Ears 51 and 53 are shaped so that lever arm 48 has side vents 54 for receiving a portion of the lower forward reach of a bicycle frame when the bicycle is mounted in the stand and the lever arm is rotated to a clamped position as described hereinafter. The tongue 56 is spaced from the pin 50 and is sized so that when the arm 48 is pivoted to the clamped position the tongue 56 will extend through one of the apertures 44, aperture 34 and into channel 30. The end of the tongue 56 is provided with an opening 58 which is disposed in channel 30 when the clamping mechanism is pivoted to the clamped position. As shown in FIG. 3, the purpose of opening 58 is to receive the shackle 59 of a padlock 60, whereby the tongue is locked against withdrawal from the apertures 34 and 42. In this way the mechanism 28 is locked in the clamped position. A padlock is used which is sized to fit in channel 30 of support member 24 as shown in FIG. 3.

It is noted that in the alternative, clamping mechanism 28 can be mounted on slide member 26, in which case only one aperture 44 would be provided in slide member 26 and a plurality of cooperating apertures 34 would be provided in support member 24.

An L-shaped reinforcing structure 62 is provided to give additional stability and strength to stand 10 with respect to torsional forces. This structure also serves as a positioning means for the frame hanger of the bicycle which is mounted in the stand. The reinforcing structure 62 comprises two arms 63 and 65 that are welded to each other and also to channel member 16 and support member 24 respectively.

Figure 4:
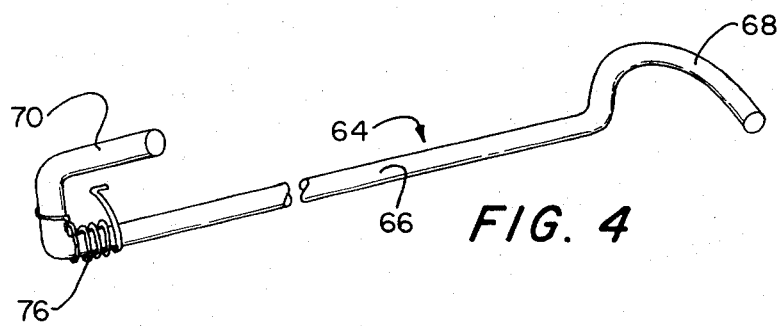
FIG. 4 is an enlarged perspective view of the front wheel locking means.

Wheel locking bar 64 is provided in order to further ensure the safety of the bicycle and in particular to help prevent the front wheel from being taken. Locking bar 64 is movably mounted with respect to channel 22 and is adapted to engage and lock the front bicycle wheel which is received by channel 22. The wheel locking bar 64 which is shown in FIGS. 1 and 2 and in greater detail in FIG. 4, comprises an elongate rod which is substantially straight along its central portion 66 and bent at its ends 68 and 70. Bar 64 is mounted for rotation on the longitudinal axis of its central portion 66. This is accomplished by mounting one end of portion 66 in a hole in bracket 72 which is attached to the side of member 16, and the other end in an aperture 74 in the side of member 24. The hole in bracket 72 and the aperture in member 24 are aligned so that the axis of bar 64 is substantially parallel to channel member 16. The end 70 of bar 64 extends through slot 32a and is urged up against the bottom edge of slide member 26 by means of spring 76. The latter is wound around bar 64 with one end hooked around the end 70 and the other end secured to the support member 24. The length of bar 64 is such that when the frame hub of a bicycle rests against the side of arm 65, the end 68 of bar 64 overlies the rim of the front wheel of the bicycle at about the six o'clock portion. When slide member 26 is moved down toward channel 22, its bottom end will engage the end 70 of bar 64 and cause it and the opposite end 68 to pivot down over channel 22.

Conversely, when slide member 26 is moved up away from channel 22, spring 76 will cause the ends of bar 64 to move up again away from channel 22.

FIG. 5 shows a bicycle 80 mounted in stand 10. The bicycle comprises a frame 82 which includes a frame hanger 84 and a down tube 86, a front wheel 88 and a rear wheel 90. The bicycle is mounted on the stand by placing wheels 88 and 90 in channel 22 and resting hanger 84 against arm 65 of the L-shaped reinforcing structure 62. Once the bicycle is positioned in channel 22, slide member 26 is moved toward channel 22 until channel member 40 embraces the down tube 86, urging the frame 82 toward channel 22. As the slide member 26 is moved toward channel 22 the bottom edge of the latter cooperates with the end 70 of bar 64 causing the latter to rotate, to pivot the end 68 down over channel 22 at the point where the front wheel 88 contacts the channel. Once the slide member 26 is moved down as far as engagment of channel member 40 with the bicycle frame will permit, it is adjusted to align aperture 34 with the closest aperture 42. Clamping mechanism 28 is then pivoted so that the tongue 56 is inserted through the aligned apertures 34 and 42 into channel 30. The shackle of padlock 60 is then inserted through the hole 58 in channel 30 locking the mechanism 28 in the clamped position.

In this position it will be very difficult if not impossible to tamper and break the padlock 60 since the latter nests in channel 30 and is protected against being struck with a hammer by the side sections 25 of support member 24. Further, neither wheel can be removed from the frame since it is necessary to lift the frame with respect to the wheels. Finally, the bar 64 provides additional protection with respect to removal of the front wheel.

In order to remove the bicycle 80, the padlock 60 is removed, clamping mechanism 28 is pivoted so that the tongue 56 is pulled out of engagement with channel 30 and apertures 34 and 42. The slide member 26 is then free to be moved up away from channel 22 so as to disengage channel member 40 from the lower forward reach of bicycle 80. At the same time spring means 76 will cause bar 64 to rotate in a direction to pivot its end 68 up and away from channel 22 so as to free the front wheel of the bicycle. The end 70 of bar 64 tends to urge slide member 26 up as a consequence of the bias exerted by spring 76.

The stand 10 can be easily constructed of any structural metal, such as iron or steel, and thus all connecting elements can be welded or bolted together, providing a strong, sturdy and durable device. It is easily adaptable for use as a bicycle stand as well as supporting strucures for other devices. For example, a municipality may mount parking meters, or regulatory signs at the top of support member 24.

Since certain obvious changes may be made in the illustrated embodiment of the device without departing from the scope of the invention, it is intended that all matter contained herein be interpreted as illustrative and not in a limiting sense.

What is claimed is:

1. A device for supporting and holding a bicycle comprising:
   channel means for receiving the front and rear wheels of a bicycle;
   a support member fixed with respect to said channel means and extending at an angle thereto;
   a slide member;
   means mounting said slide member to said support member so that said slide member is slidable relative to said support member toward and away from said channel means; and
   pivotally mounted clamp means for clamping a portion of the frame of said bicycle to said slide member and for locking said slide member against movement relative to said support means.

2. A device according to claim 1 including a first aperture in said support member and a second aperture in said slide member, said apertures being alignable with each other by relative movement of said slide member and said support member, and a tongue on said clamping means sized and disposed so as to pass into and project through said apertures when said apertures are mutually aligned and said clamping means is pivoted into clamping position.

3. A device according to claim 2 wherein said tongue is adapted to be locked to said support member so as to hold said clamp means in said clamping position.

4. A device according to claim 2 wherein said support member includes a channel and said tongue is sized to project into said channel through said mutually aligned apertures, and further wherein the portion of said tongue that projects into said channel has an opening to receive the shackle of a padlock whereby said tongue can be locked against withdrawal from said apertures.

5. A device according to claim 2 wherein said slide member includes additional apertures, each alignable with the aperture in said support member by relative movement of said slide member and said support member, and further wherein said additional apertures are sized to accommodate said tongue so that said clamping means can be pivoted into clamping position regardless of which of said additional apertures is aligned with the apertures in said support member.

6. A device according to claim 1 wherein said support member is disposed at substantially a right angle to said channel means.

7. A device according to claim 1 further including wheel locking means movably mounted to said channel means for engaging a bicycle wheel received by said channel means and locking said wheel to said channel means.

8. A device according to claim 7 wherein said wheel locking means is movable into and out of wheel locking position responsively to movement of said slide member.

9. A device according to claim 7 further including means for pivotally mounting said wheel locking means to said channel means and wherein said wheel locking means includes an arm portion that is disposed to be engaged by said slide member, said arm portion being arranged to pivot said locking means into wheel locking position responsively to movement of said slide member.

10. A device according to claim 9 including spring means for urging said wheel locking means out of said wheel locking position.

11. A device according to claim 1 including a handle attached to said slide member for moving said slide member relative to said support member.

12. A device according to claim 11 wherein said handle is attached to said slide member by means extending through an elongate slot in said support member.

13. A device according to claim 1 further including a bicycle frame retaining means attached to and movable with said slide member.

14. A device according to claim 13 wherein said retaining means comprises a channel member that extends at an acute angle to said channel means and is adapted to embrace a portion of a bicycle frame.

15. A device according to claim 13 wherein said retaining means is adapted to engage a portion of a bicycle frame and to urge said frame portion toward said channel means.

16. A device according to claim 1 further including stop means at one end of said channel means for engaging one of the wheels of said bicycle.

17. A device according to claim 1 including means fixed with respect to said support means in position to intercept another portion of said bicycle frame.

* * * * *